US006349472B1

(12) United States Patent
Parsons et al.

(10) Patent No.: US 6,349,472 B1
(45) Date of Patent: Feb. 26, 2002

(54) CUTTING DEVICE

(75) Inventors: Kevin L. Parsons, Appleton; James Boda, Merrimac, both of WI (US)

(73) Assignee: Armament Systems and Procedures, Inc., Appleton, WI (US)

( * ) Notice: Subject to any disclaimer, the term of this patent is extended or adjusted under 35 U.S.C. 154(b) by 0 days.

(21) Appl. No.: 09/419,412

(22) Filed: Oct. 15, 1999

Related U.S. Application Data

(63) Continuation-in-part of application No. 29/111,926, filed on Oct. 6, 1999.

(51) Int. Cl.[7] .................................................. A21C 5/00

(52) U.S. Cl. ............................. 30/115; 30/278; 30/162; 30/286

(58) Field of Search .......................... 30/153, 278, 241, 30/242, 292, 319, 162, 113, 109, 335, 115, 286

(56) References Cited

U.S. PATENT DOCUMENTS

| | | | | | |
|---|---|---|---|---|---|
| 530,913 | A | * 12/1894 | Cook, Jr. | ..................... | 30/242 |
| 1,066,456 | A | * 7/1913 | Barrows | ..................... | 39/242 |
| 2,716,813 | A | * 9/1955 | Smyres | ..................... | 30/241 |
| 4,502,220 | A | * 3/1985 | Aoki | ..................... | 30/154 |
| 4,715,121 | A | * 12/1987 | Sugiyama et al. | ..................... | 30/253 |
| 4,791,725 | A | * 12/1988 | Amagaya | ..................... | 30/154 |
| 4,845,849 | A | * 7/1989 | Aubriot | ..................... | 30/92 |
| 4,873,767 | A | * 10/1989 | Lok | ..................... | 30/278 |
| 5,218,765 | A | * 6/1993 | Huang | ..................... | 30/241 |
| 5,373,639 | A | * 12/1994 | Huang | ..................... | 30/242 |
| 5,711,078 | A | * 1/1998 | Patton et al. | ..................... | 30/241 |
| 5,992,022 | A | * 11/1999 | Carrera Moya | ..................... | 30/278 |

* cited by examiner

*Primary Examiner*—Rinaldi I. Rada
*Assistant Examiner*—Omar Flores Sánchez
(74) *Attorney, Agent, or Firm*—Robert F. I. Conte; Lee, Mann, Smith, McWilliams, Sweeney & Ohlson

(57) ABSTRACT

A cutting device having a head member having a movable cutting blade positioned therein, first and second legs pivotally mounted on said head member, a connector connecting the first leg, the cutting blade, and the second blade, wherein the connector and cutting blade are movable within a slot in the head member to bring the cutting blade into cutting engagement with a shield connected to said head member when the legs are moved into a closed position.

36 Claims, 4 Drawing Sheets

CUTTING DEVICE

This application is a continuation-in-part of recently filed design patent application, Parsons et al., bearing reference number 99,735 application Ser. No. 29/111,926, filed on Oct. 6, 1999.

BACKGROUND OF INVENTION

1. Field of Invention

This invention is directed generally to a cutting device, and more particularly to a cutting device having a pair of opposed legs pivoting about a head member and connected to a cutting blade. The cutting device of the present invention is particularly useful for cutting plastic restraints, cable ties, and the like.

2. Background of the Invention

Restraining devices such as handcuffs are well-known and have been available for many years. The best known restraining devices are handcuffs consisting of a pair of metal rings which are placed about the wrists of an individual and locked into place. While traditional handcuffs serve the purpose of restraining an individual, they have a number of drawbacks. Conventional handcuffs are heavy, bulky to carry, expensive, require a key and are often inconvenient, particularly in multiple arrest situations such as riots and the like. Because of these drawbacks, it has become more and more desirable to design handcuffs or restraints which are lightweight, inexpensive and do not require a key. Moreover, it has become desirable to utilize disposable restraints, particularly in multiple arrest situations such as mass arrests of demonstrators and gangs.

Further, there has been a movement toward using disposable restraints due to the increasing concern of the spreading of AIDS, as well as Hepatitis, since restrained individuals who struggle violently often create open wounds which result in blood on the handcuffs. Disposable restraints assure that the handcuffs will not be reused and thereby cannot create a carrier for communicable diseases through contamination due to cuts or abrasions received during the detainment.

One type of disposable restraint is described in U.S. Pat. No. 5,669,110. Disposable restraints are made of relatively tough plastic to insure that a detainee cannot break free once restrained. One drawback associated with the use of such disposable restraints is the difficulty in removing the restraints. In the past, the restraints have been removed from a detainee by using a cutting tool such as a scissors, clippers, knife, or other implement having an exposed blade(s). However, the use of implements of this type presents the risk of injury to the detainee. The restraints are often tightly positioned about the wrist. When using a scissors, for example, one leg of the scissors is positioned between the wrist and the restraint and then the cutting action of the scissors is performed. When cutting the restraining device in this manner, there is a risk that the exposed scissor legs may cut the wrist of the detainee. This risk increases when the detainee is struggling. Accordingly, there is a need to provide a device for removing restraints that reduces the risk of injury to the detainee upon removal of the restraints. There is also a need to provide a cutting device that can quickly and efficiently be used to remove the restraints.

Most restraint cutters are simple applications of existing tools. They are not designed for the unique applications faced by public safety personnel. They are often misplaced in a correctional environment. Furthermore, knives, scissors and other open-bladed implements can be turned against an officer.

In addition, when using a scissors or clippers, these devices operate by cutting from one side of a restraint to the other. In practice, these devices can often slip off of the restraint prior to severance, and thus having the effect of sliding the restraint between the legs of the scissors as opposed to severing it. Thus there is a further need to provide a cutting device that reduces this problem of slippage that can often occur when using a traditional scissors or clippers to sever the restraint.

SUMMARY OF THE INVENTION

The subject invention is specifically directed to a compact, easily carried, and lightweight cutting device having a movable cutting blade and a pair of legs that are pivotally mounted to a head member of the cutting device and that are connected to the cutting blade. The cutting device is equipped with a shield which serves as a safety guard to cover the blade and protect a detainee from inadvertent injury upon removal of the restraints. The shield also serves to provide a cutting surface wherein the restraint is positioned between the cutting surface and the cutting blade. To sever the restraint, the legs of the cutting device are pulled together in a manner similar to actuating a pair of pliers. As the legs come together, the cutting blade moves into engagement with the restraint. The tip of the cutting blade pierces the restraint, and upon further forward movement, the cutting blade cuts through the restraint while entering a slit positioned within the cutting surface. In this manner, the cutting device uses compound leverage to facilitate severing the restraint. Unlike scissors or clippers, when the tip of the cutting blade engages the restraint, the restraint is pinned in place against the cutting surface of the shield. This eliminates the problem of slippage associated with using scissors or clippers.

The cutting device of the present invention provides a cutting device for severing disposable restraints having a shielded cutting blade located in a restricted area where fingers or other body parts cannot enter. The cutting device severs the restraint by initially piercing the restraint and thus eliminates the problem of slippage associated with using traditional scissors or clippers.

In a preferred embodiment, the cutting device further includes leg extensions having hooks that latch onto the opposing leg such that when the leg extensions are in the retracted position, the legs are locked in their closed position. When the leg extensions are pulled out into the extended position, the cutting device is in its unlocked, operable position, and the legs are freely movable into an unlocked open position. This provides an added measure of safety that allows the cutting device to remain in a locked condition when not in use, and prevents the cutting device from being turned against an officer. The cutting device may also be provided with a keying hole on the legs or leg extensions whereby the cutting device may be attached to one's keying and easily accessible when needed.

In a preferred embodiment, the cutting blade has a triangular end culminating in a centrally located outer cutting tip. The cutting blade is disposed in a corresponding slit in the cutting device and preferably has two parallel sides. Two parallel stainless steel pins are preferably located directly adjacent to both sides of the cutting blade such that both sides of the cutting blade ride against the pins during movement of the cutting blade. The use of the parallel stainless steel pins prohibits the cutting blade from binding in the cutting blade slit during operation. Thus, they provide for reliable, smooth, and trouble-free operation.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
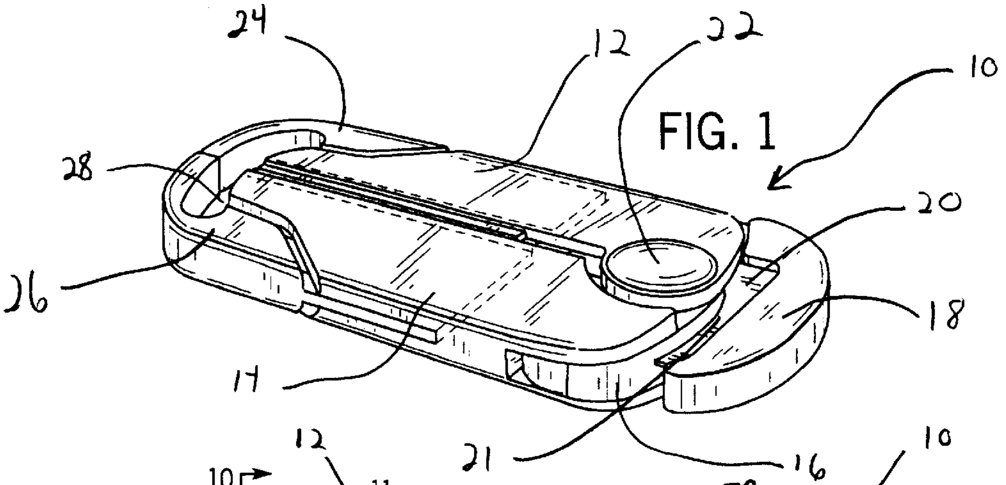
FIG. 1 is a perspective view of the cutting device of the present invention.

While the invention is susceptible to various modifications and alternative forms, specific embodiments thereof are shown by way of example in the drawings and will herein be described in detail. It should be specifically understood with respect to the drawings, that the drawings are of a preferred embodiment, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

DETAILED DESCRIPTION OF THE PREFERRED EMBODIMENT

A cutting device 10 made in accordance with the principles of the subject invention is depicted in FIGS. 1–15. As shown in FIG. 1, cutting device 10 preferably includes a first leg 12 and second leg 14 pivotally mounted to head member 16. First and second legs 12 and 14 are preferably mounted using a circular hub on the leg that intersects and fits within a corresponding circular bore on the head member, or vice versa. Shield 18 is connected to head member 16 and is preferably integral therewith. Cutting blade 20 is positioned within head member 16 and in FIG. 1 extends through cutting chamber 21 to shield 18. Also shown are first leg extension 24 and second leg extension 26 as well as keying opening 28. As discussed below in describing FIGS. 12–13, connector 22 extends through a circular opening of the first leg 12 through a slot in head member 16, through cutting blade 20 through a circular opening of the second leg 14 to connect the first leg 12, cutting blade 20, and second leg 14.

Figure 2:
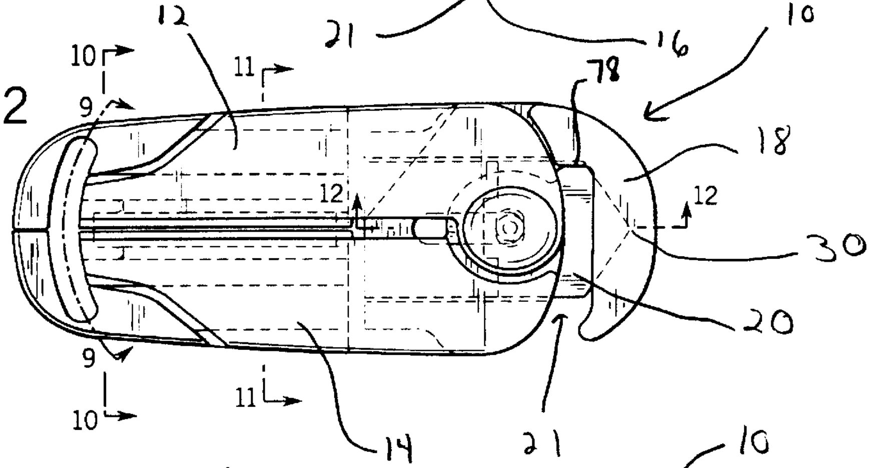
FIG. 2 is a front view of the cutting device.
Figure 3:
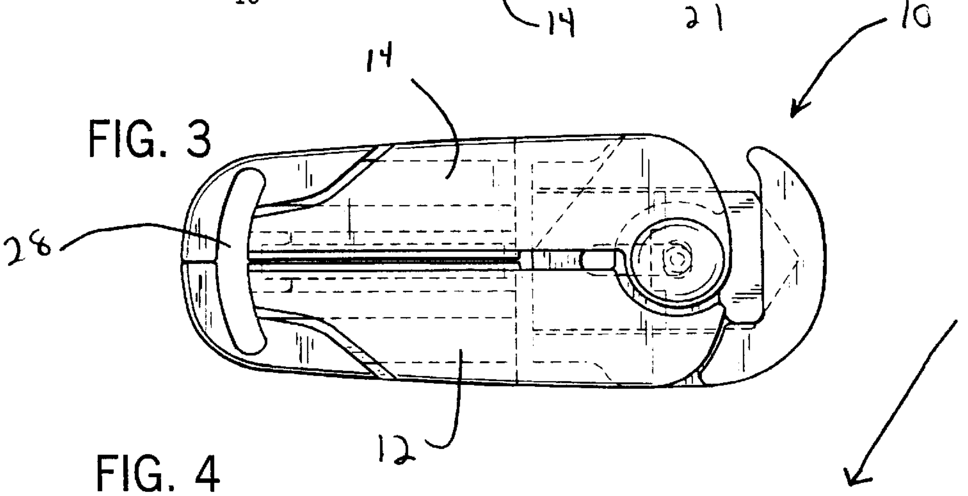
FIG. 3 is a back view of the cutting device.

In FIGS. 1–3, the legs 12 and 14 are in a closed, locked position with leg extensions 24 and 26 in a first retracted position. In this closed, locked position, cutting blade 20 is in an extended position and the outer cutting tip 30 is positioned within shield 18. In this closed, locked position, the legs 12 and 14 cannot be opened and keying opening 28 can be used to easily attach the cutting device to one's person. The ability to easily and reliably access the cutting device provided by the keying opening is a benefit of the preferred embodiment, otherwise public safety officials may be required to resort to more dangerous and less efficient cutting implements such as knives or scissors.

In a preferred embodiment the head member 16, shield 18, legs 12 and 14, and leg extensions 24 and 26 are comprised of a durable, lightweight plastic material, and most preferably comprised of a glass-reinforced nylon material having the tradename Zytel and available from DuPont.

Figure 4:
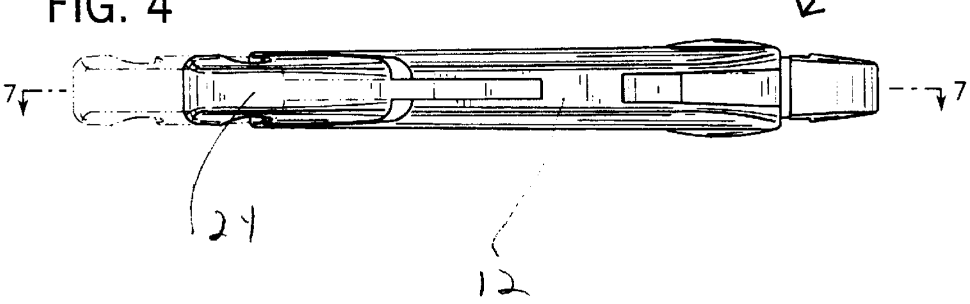
FIG. 4 is a side view of the cutting device.
Figure 5:
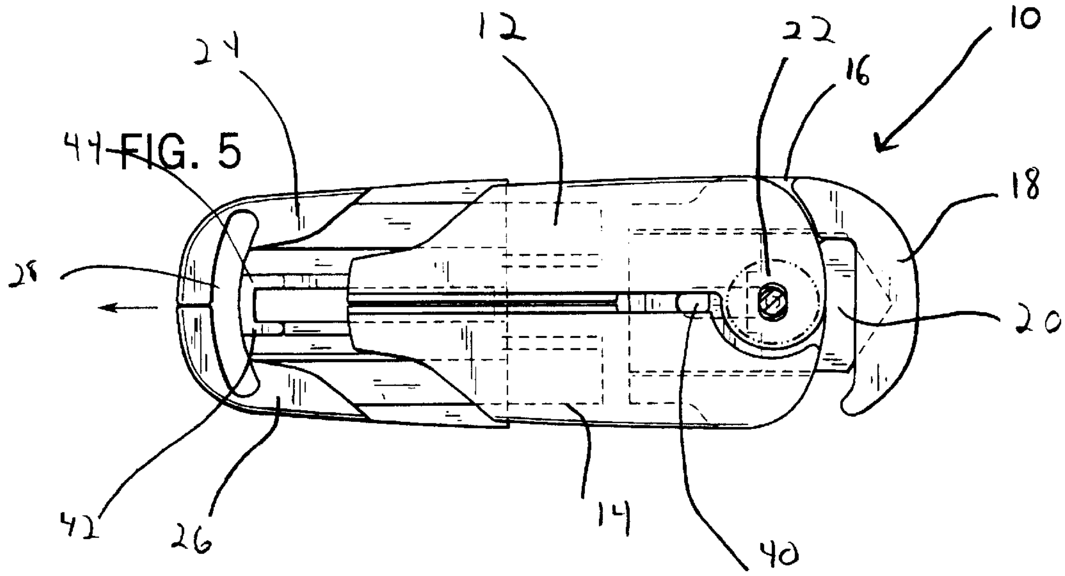
FIG. 5 is a front view of the cutting device with the first and second leg extensions in the extended position and the legs in the closed position.

FIG. 4 shows cutting device 10 and illustrates how leg extension 24 slidably fits within leg 12. FIG. 5 shows cutting device 10 with leg extensions 24 and 26 in a second extended position. Leg extensions 24 and 26 are moved into the second extended position by grasping the keyring opening and pulling the leg extensions in a direction away from the cutting blade. With leg extensions 24 and 26 in the second extended position, the cutting device 10 is in a closed, operable position, where latches 42 and 44 are no longer in locking engagement with legs 12 or 14 and the legs may be pulled apart into an open position. Thus, the cutting device is operably movable from a closed, locked position as shown in FIGS. 1–3, to a closed, operable position shown in FIG. 5. In both the closed, locked position and the closed, operable position, the connector 22 is located at an upper point of slot 40 and cutting blade 20 is in an extended position within shield 18.

Figure 6:
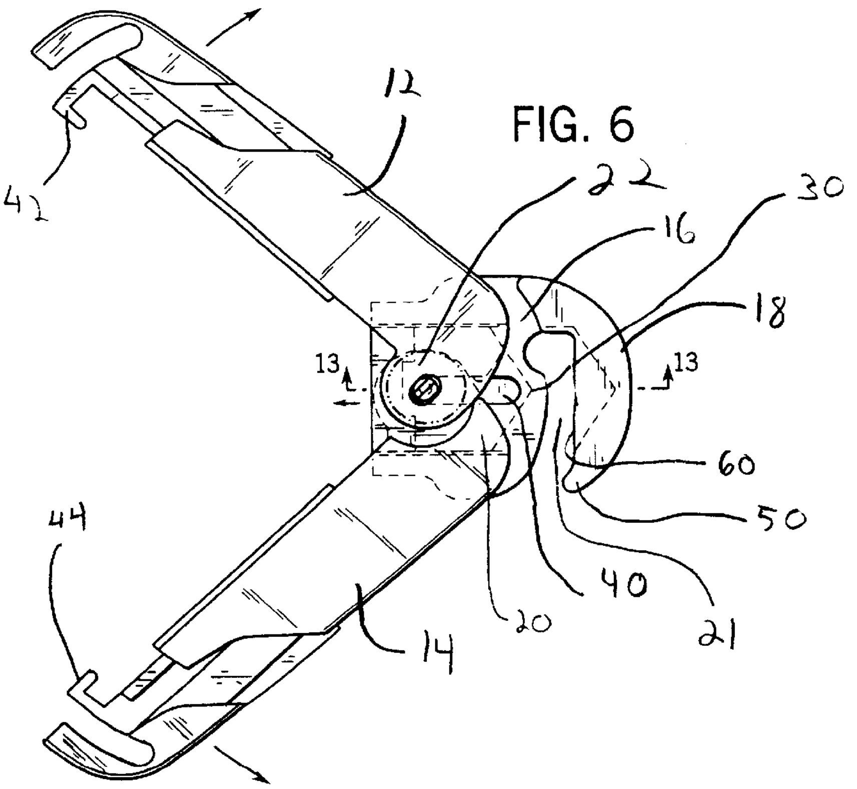
FIG. 6 is a front view of the cutting device with the first and second leg extensions in the extended position and the legs in the open position.

FIG. 6 shows legs 12 and 14 in an open position. As legs 12 and 14 are moved into the open position, connector 22 and cutting blade 20 move to a lower point of slot 40 and cutting blade 20 is in a retracted position within head member 16. In this open position, cutting chamber 21 is available to receive a restraint into the cutting chamber 21. In this open position of FIG. 6, public safety officials can position shield 18 between the wrist of a detainee and the restraint to position the restraint into cutting chamber 21. Shield 18 may include lip 50 to facilitate the insertion of the shield 18 between the restraint and wrist and to help retain the restraint within the cutting chamber once it has been inserted. Shield 18 and lip 50 are preferably in close proximity to the top of head member 16. Most preferably the distance between the shield 18 or lip 50 and the top of head member 16 is less than 0.25 inches. This prevents fingers, folds of skin or other body parts to enter the path of the cutting blade within the cutting chamber and further helps to prevent the risk of injury. Shield 18 should also have a sufficiently narrow width to allow the shield to be placed between the wrist of a detainee and the restraint and the lip 50 is preferably more narrow than the rest of the shield.

Figure 15:
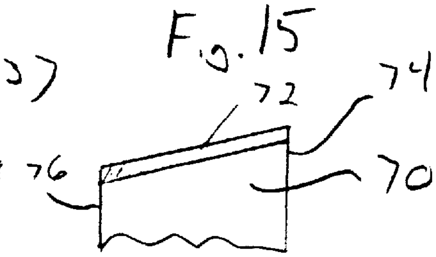
FIG. 15 is a view of one of the many other types of cutting blades that could be used in the cutting device.

Once the restraint is within cutting chamber 21, the restraint may be severed by moving legs 12 and 14 back into the closed, operable position of FIG. 5. In moving the legs 12 and 14 together connector 22 moves from a lower point of slot 40 to an upper point of slot 40 and the cutting blade in turn engages the restraint. In a preferred embodiment, the cutting blade 20 has an outer cutting point 30 that moves into cutting engagement with the restraint. In this manner the cutting blade 20 pins the restraint against a cutting surface 60 of shield 18. As cutting blade 20 moves toward shield 18, the outer cutting point 30 pierces the restraint. As shown in FIG. 15, the cutting blade 20 may include angled cutting surfaces 35 and 37. When using such a cutting blade, as the cutting blade moves forward into a slit in shield 18, the angled cutting surfaces 35 and 37 provide a cutting action in opposite directions from the point of piercing to cut the restraint in two directions.

The cutting device of the present invention provides for compound leverage as a moment of force is supplied about both hubs where the legs 12 and 14 are pivotally connected to the head member 16 and in turn provide a stronger force to the connector and cutting blade in an axial direction along the slot 40 of head member 16. The use of compound leverage and a cutting blade that works to cut the restraint in two directions, serves to provide a relatively easy cutting action. In fact, very little squeezing force in bringing the legs together is required to effectuate the severing of the restraint. Thus, restraints can be quickly and efficiently removed with the cutting device of the present invention.

FIG. 15 shows an alternative cutting blade 70 having an angled cutting blade 72. When using a blade of this type, and positioned in the cutting device of FIG. 2 with side 76 located near enclosed portion 78 of cutting chamber 21, and side 74 located near the open end of cutting chamber 21, the blade serves to trap the restraint within the cutting chamber 21 and force the restraint against the enclosed portion 78. Using a blade of this type and in this manner eliminates the problem of slippage encountered when using traditional cutting implements such as scissors or knives. It will be appreciated by those of skill in the art that many other types of blades could be used in the cutting device and still gain from the benefits of the present invention.

Figure 7:
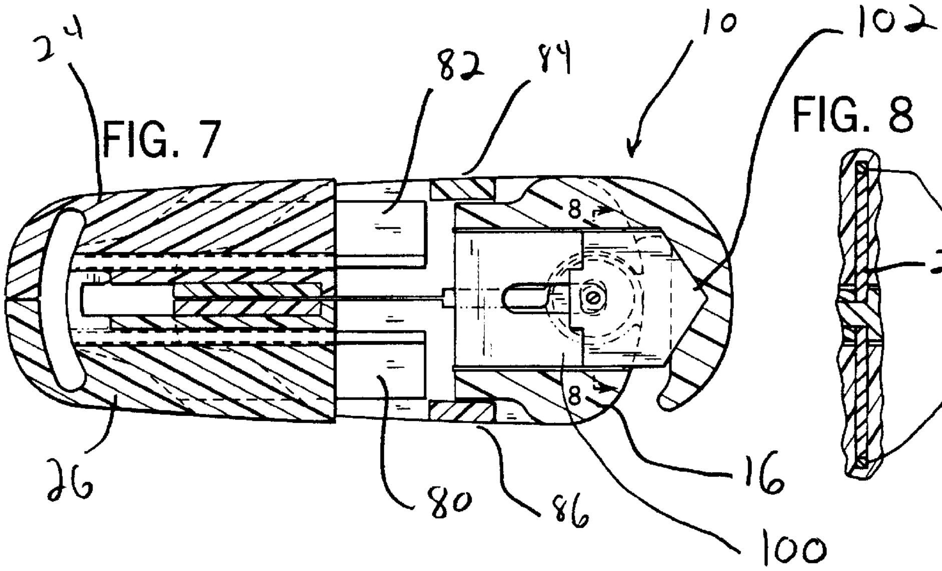
FIG. 7 is a cross-sectional view taken along line 7—7 of FIG. 4.

FIG. 7 shows a cross-sectional view along line 7—7 of FIG. 4. This view shows guides 80 and 82 upon which leg extensions 26 and 24 are respectively aligned. These guides 80 and 82 provide for a smooth slidable engagement between the legs and the leg extensions. FIG. 7 also shows stops 84 and 86 against which leg extensions 24 and 26 abut when in the closed, locked position. FIG. 7 also shows transverse slit 100 with head member 16 and corresponding slit 102 within shield 18. Cutting blade 20 is positioned in the transverse slit 100 within head member 16.

Figure 8:
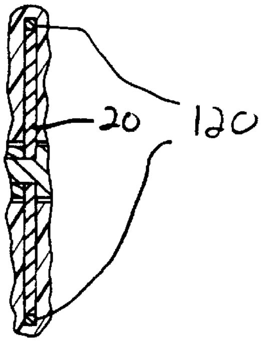
FIG. 8 is a cross-sectional view taken along line 8—8 of FIG. 7, and showing the cutting blade, connecting rivet, and guide pins.
Figure 14:
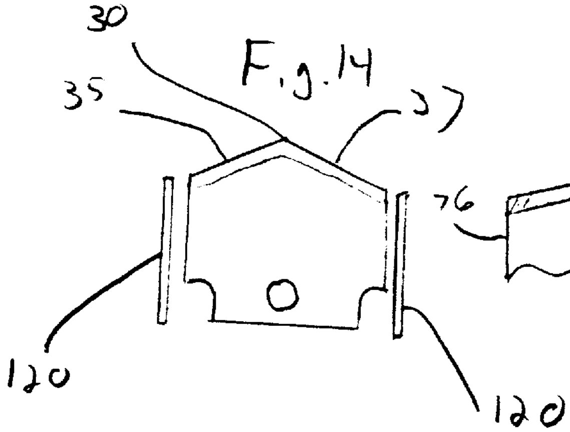
FIG. 14 is a view of the cutting blade and guide pins.

FIGS. 8 and 14 show pins 120 located on either side of cutting blade 20. Pins 120 serve as a guide for cutting blade 20 as it moves from a closed retracted condition to an extended condition. The use of the pins 120 prevent the cutting blade from binding against the sides of transverse slit 100 during operation and also prevent wear of the walls of the transverse slit 100. Pins 120 are preferably made of metal and most preferably are made of stainless steel. Cutting blade 20 is similarly preferably comprised of a high carbon stainless steel.

Figure 9:
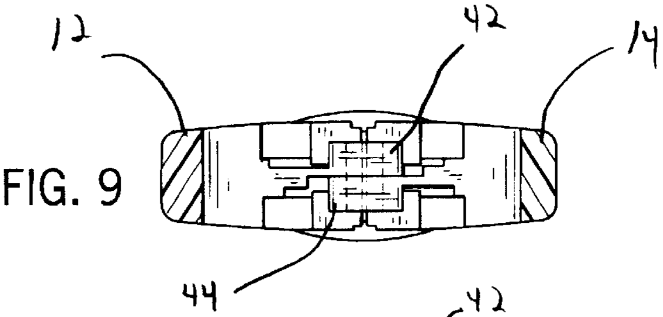
FIG. 9 is a cross-sectional view taken along line 9—9 of FIG. 2, showing the legs locked in place.
Figure 10:
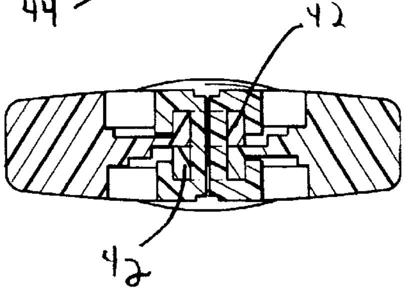
FIG. 10 is a cross-sectional view taken along line 10—10 of FIG. 2, showing the latches of the leg extensions locked in place.
Figure 11:
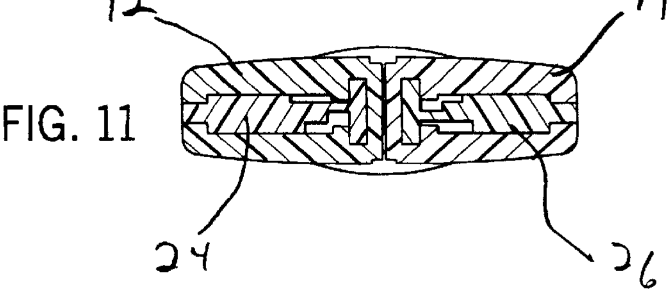
FIG. 11 is a cross-sectional view taken along line 11—11 of FIG. 2, showing the leg extensions housed within the legs.

FIG. 9 shows a cross-sectional view along line 9—9 of FIG. 2 and shows legs 12 and 14 in a locked condition as latches 42 and 44 are locking the legs together. FIG. 10 shows a cross-sectional view along line 10—10 of FIG. 2 and also shows the latches 42 and 44 in a locked condition. FIG. 11 is a cross-sectional view along line 11—11 of FIG. 11 showing leg extensions 24 and 26 slidably engaged with legs 12 and 14.

Figure 12:
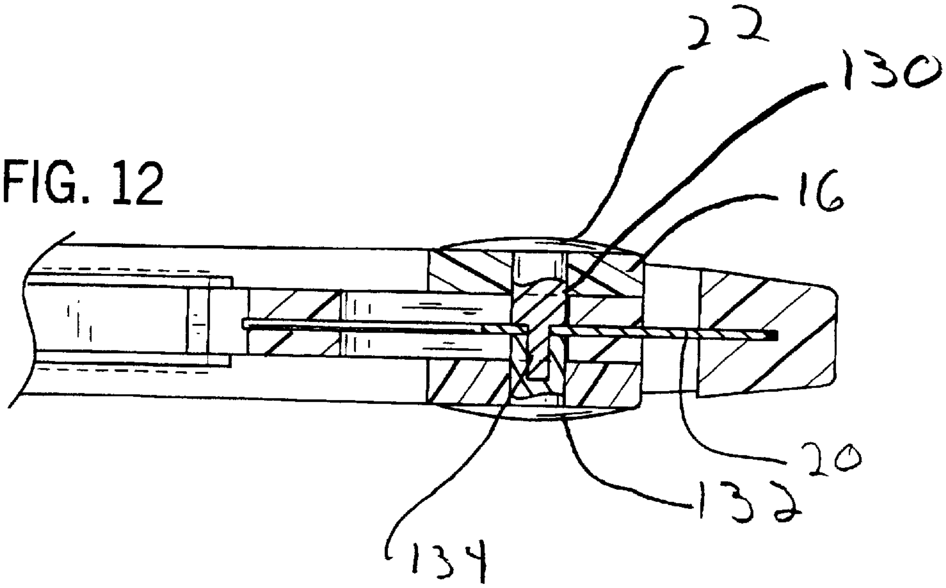
FIG. 12 is a cross-sectional view taken along line 12—12 of FIG. 2, showing the cutting blade within the head member and shield.
Figure 13:
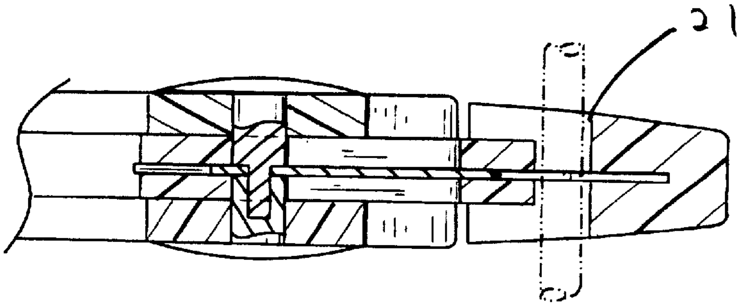
FIG. 13 is a cross-sectional view taken along line 13—13 of FIG. 6, showing the cutting blade in a retracted condition within the head member, and showing a phantom view of a restraint within the cutting chamber.

FIG. 12 shows a cross-sectional view along line 12—12 of FIG. 2 and FIG. 13 shows a cross-sectional view along line 13—13 of FIG. 6. FIG. 12 shows the connector 22 comprised of first rivet section 130 and second rivet section 132 wherein the first rivet section 130 includes an extension 134 which extends through a hole in cutting blade 20. In this manner the connector 22 pins the cutting blade between the first and second rivet sections 130 and 132, and cutting blade 20 is positioned within head member 16. FIG. 13 depicts a similar view, except that in FIG. 12 the cutting device is in the closed, locked position and in FIG. 13 the cutting device is in the open position and able to receive a restraint (shown in phantom lines) within cutting chamber 21. In a preferred embodiment connector 22 is a stainless steel rivet, although the connector could take many forms including a screw, bolt, pin, or other connective device known to those of skill in the art.

While certain features and embodiments of the invention have been described herein, it will be readily understood that the invention encompasses all modifications and enhancements within the scope and spirit of the present invention.

What is claimed is:

1. A cutting device comprising:

a head member having a top side, left and right sides and a through slot positioned therebetween, and further including a transverse slit for housing a cutting blade, said transverse slit extending from said top side and intersecting said through slot;

a first leg pivotally mounted to said left side and an opposed second leg pivotally mounted to said right side;

a cutting blade positioned within said transverse slit, a connector extending through said slot and directly connecting said first leg, said cutting blade, and said second leg;

said head member further including a shield extending from one of said sides, said shield having a cutting surface positioned opposite said transverse slit and said top side to define a cutting chamber between said top side and said shield;

and wherein when said first and second legs are in an open position said cutting blade is in a retracted condition within the slit, and when the first and second legs are moved into a closed position, said cutting blade moves into cutting engagement with the cutting surface of said shield; wherein when the first and second legs are moved into a fully closed position, the cutting blade extends into a corresponding slit positioned in the shield opposite the transverse slit in the head member.

2. The cutting device of claim 1, wherein the cutting blade has a centrally located cutting tip.

3. The cutting device of claim 2, wherein said cutting tip is located in axial alignment with said slot.

4. The cutting device of claim 1, wherein the cutting blade is angled upwardly away from an enclosed portion of said cutting chamber.

5. A cutting device comprising:

a head member having a top side, left and right sides and a through slot positioned therebetween, and further including a transverse slit for housing a cutting blade, said transverse slit extending from said top side and intersecting said through slot;

a first leg pivotally mounted to said left side and an opposed second leg pivotally mounted to said right side;

a cutting blade positioned within said transverse slit, a connector extending through said slot and directly connecting said first leg, said cutting blade, and said second leg;

said head member further including a shield extending from one of said sides, said shield having a cutting surface positioned opposite said transverse slit and said top side to define a cutting chamber between said top side and said shield;

and wherein when said first and second legs are in an open position said cutting blade is in a retracted condition within the slit, and when the first and second legs are moved into a closed position, said cutting blade moves into cutting engagement with the cutting surface of said shield;

wherein two parallel pins are located in said transverse slit on either side of the cutting blade, and wherein said cutting blade rides between said pins during movement.

6. The cutting device of claim 5, wherein said pins are made of stainless steel.

7. A cutting device comprising:

a head member having a top side, left and right sides and a through slot positioned therebetween, and further including a transverse slit for housing a cutting blade, said transverse slit extending from said top side and intersecting said through slot;

a first leg pivotally mounted to said left side and an opposed second leg pivotally mounted to said right side;

a cutting blade positioned within said transverse slit, a connector extending through said slot and directly connecting said first leg, said cutting blade, and said second leg;

said head member further including a shield extending from one of said sides, said shield having a cutting surface positioned opposite said transverse slit and said top side to define a cutting chamber between said top side and said shield;

and wherein when said first and second legs are in an open position said cutting blade is in a retracted condition within the slit, and when the first and second legs are moved into a closed position, said cutting blade moves into cutting engagement with the cutting surface of said shield;

wherein said shield extends beyond said transverse slit and terminates in a lip located in close proximity to said top side of said head member;

and wherein said lip terminates at a distance of 0.25 inches or less from said top side of said head member.

8. A cutting device comprising:

a head member having a top side, left and right sides and a through slot positioned therebetween, and further including a transverse slit for housing a cutting blade, said transverse slit extending from said top side and intersecting said through slot;

a first leg pivotally mounted to said left side and an opposed second leg pivotally mounted to said right side;

a cutting blade positioned within said transverse slit, a connector extending through said slot and directly connecting said first leg, said cutting blade, and said second leg;

said head member further including a shield extending from one of said sides, said shield having a cutting surface positioned opposite said transverse slit and said top side to define a cutting chamber between said top side and said shield;

and wherein when said first and second legs are in an open position said cutting blade is in a retracted condition within the slit, and when the first and second legs are moved into a closed position, said cutting blade moves into cutting engagement with the cutting surface of said shield; and further including a first leg extension movable within said first leg and a second leg extension movable within said second leg.

9. The cutting device of claim 8, where said first leg extension is movable from a first retracted position to a second extended position and said second leg extension is movable from a first retracted position to a second extended position.

10. The cutting device of claim 9, wherein one of the leg extensions includes a latch, wherein when said leg extension is moved into its first retracted position when the legs are in the closed position, the latch engages a portion of the other leg extension wherein the legs become locked in the closed position.

11. The cutting device of claim 10, wherein said latch is J-shaped.

12. The cutting device of claim 10, wherein the other leg extension also includes a latch, wherein when said other leg extension is moved into its first retracted position when the legs are in the closed position said latch engages a portion of the other leg extension wherein the legs become locked in the closed position.

13. The cutting device of claim 9, wherein one of the leg extensions includes a latch, wherein when said leg extension is moved into its first retracted position when the legs are in the closed position, the latch engages a portion of the other leg wherein the legs become locked in the closed position.

14. The cutting device of claim 13, wherein the other leg extension also includes a latch, wherein when said other leg extension is moved into its first retracted position when the legs are in the closed position said latch engages a portion of the other leg wherein the legs become locked in the closed position.

15. The cutting device of claim 13, wherein said latch is J-shaped.

16. A cutting device comprising:

a head member having a top side, left and right sides and a through slot positioned therebetween, and further including a transverse slit for housing a cutting blade, said transverse slit extending from said top side and intersecting said through slot;

a first leg pivotally mounted to said left side and an opposed second leg pivotally mounted to said right side;

a cutting blade positioned within said transverse slit, a connector extending through said slot and directly connecting said first leg, said cutting blade, and said second leg;

said head member further including a shield extending from one of said sides, said shield having a cutting surface positioned opposite said transverse slit and said top side to define a cutting chamber between said top side and said shield;

and wherein when said first and second legs are in an open position said cutting blade is in a retracted condition within the slit, and when the first and second legs are moved into a closed position, said cutting blade moves into cutting engagement with the cutting surface of said shield;

wherein said connector comprises a rivet.

17. The cutting device of claim 16, wherein said rivet comprises a first piece and a second piece, and said first piece includes an extension that passes through a corresponding hole in said cutting blade and mates with said second piece, thereby positioning the cutting blade between the first and second piece.

18. A cutting device comprising:
- a head member having a cutting blade disposed therein;
- first and second legs pivotally mounted to said head member;
- a connector operatively connecting said first leg, said cutting blade and said second leg;
- said connector and cutting blade movable within a slot in said head member;
- a shield connected to said head member disposed in a path of said cutting blade; and
- said cutting blade being positioned between two parallel pins located within the head member.

19. A cutting device comprising:
- a head member having a top side, left and right sides and a through slot positioned therebetween, and further including a transverse slit for housing a cutting blade, said transverse slit extending from said top side and intersecting said through slot;
- a first leg pivotally mounted to said left side and an opposed second leg pivotally mounted to said right side;
- a cutting blade positioned within said transverse slit,
- a connector extending through said slot and directly connecting said first leg, said cutting blade, and said second leg;
- said head member further including a shield extending from one of said sides, said shield having a cutting surface positioned opposite said transverse slit and said top side to define a cutting chamber between said top side and said shield;
- and wherein when said first and second legs are in an open position said cutting blade is in a retracted condition within the slit, and when the first and second legs are moved into a closed position, said cutting blade moves into cutting engagement with the cutting surface of said shield;
- wherein said cutting surface of said shield is positioned 0.25 inches or less from said top side of said member.

20. A cutting device comprising:
- a head member having a cutting blade disposed therein;
- first and second legs pivotally mounted to said head member;
- a connector directly connecting said first leg, said cutting blade and said second leg;
- said connector and cutting blade movable within a slot in said head member;
- and a shield connected to said head member disposed in a path of said cutting blade;
- wherein when said first and second legs are in an open position said cutting blade is in a retracted condition generally within said head member, and when the first and second legs are moved into a closed position said cutting blade moves in a direction of said shield.

21. The cutting device of claim 20, wherein said shield includes a cutting surface and wherein when the first and second side legs are in said closed position an outer portion of said cutting blade extends into said shield.

22. A cutting device comprising:
- a head member having a cutting blade disposed therein;
- first and second legs pivotally mounted to said head member;
- a connector directly connecting said first leg, said cutting blade and said second leg;
- said connector and cutting blade movable within a slot in said head member;
- and a shield connected to said head member disposed in a path of said cutting blade;
- wherein the cutting blade is positioned between two parallel pins located within the head member.

23. The cutting device of claim 22, wherein said pins are made of stainless steel.

24. A cutting device comprising:
- a head member having a cutting blade disposed therein;
- first and second legs pivotally mounted to said head member;
- a connector directly connecting said first leg, said cutting blade and said second leg;
- said connector and cutting blade movable within a slot in said head member;
- and a shield connected to said head member disposed in a path of said cutting blade;
- further including a first leg extension movable within said first leg and a second leg extension movable within said second leg.

25. The cutting device of claim 24, where said first leg extension is movable from a first retracted position to a second extended position and said second leg extension is movable from a first retracted position to a second extended position.

26. The cutting device of claim 25, further including locking means for locking the legs in a closed position when the first and second leg extensions are positioned in the first retracted position.

27. The cutting device of claim 25, wherein one of the leg extensions includes a latch, and when said leg extension is moved into its first retracted position when the legs are in the closed position, the latch engages a portion of the other leg or leg extension and the first and second legs become locked in the closed position.

28. The cutting device of claim 27, wherein said latch is J-shaped.

29. A cutting device comprising:
- a head member having a cutting blade disposed therein;
- first and second legs pivotally mounted to said head member;
- a connector directly connecting said first leg, said cutting blade and said second leg;
- said connector and cutting blade movable within a slot in said head member; and a shield connected to said head member disposed in a path of said cutting blade; wherein said cutting blade includes an outer cutting tip, and wherein an article to be severed is positioned between said cutting tip and said shield, and wherein a cutting chamber is defined between said head member and said shield; and the cutting chamber has a width of less than 0.25 inches.

30. A cutting device for severing a plastic restraint comprising:
- a head member having a cutting blade disposed therein;
- first and second legs pivotally mounted to said head member;

a connector directly connecting said first leg, said cutting blade and said second leg;

said connector and cutting blade movable within a slot in said head member;

and a shield connected to said head member disposed in a path of said cutting blade;

and a cutting chamber defined by said shield and said head member for placement of the plastic restraint to be severed; wherein the cutting blade pins the restraint against a cutting surface of the shield when the cutting blade is brought into cutting engagement with the restraint; and wherein the cutting blade has an outer contact point and angled cutting surfaces extending from either side of the outer contact point.

31. The cutting device of claim 30, wherein the outer contact point of the cutting blade is positioned such that the outer contact point of the cutting blade contacts a central portion of the restraint when the restraint is positioned within the cutting chamber.

32. The cutting device of claim 31, wherein when the legs are moved into their closed position the cutting blade severs the restraint from said central portion towards sides of said restraint.

33. A cutting device comprising:

a head member having a cutting blade disposed therein;

first and second legs pivotally mounted to said head member;

a connector operatively connecting said first leg, said cutting blade and said second leg;

said connector and cutting blade movable within a slot in said head member;

a shield connected to said head member disposed in a path of said cutting blade; and a first leg extension movable within said first leg and a second leg extension movable within said second leg.

34. The cutting device of claim 33, where said first leg extension is movable from a first retracted position to a second extended position and said second leg extension is movable from a first retracted position to a second extended position.

35. The cutting device of claim 34, further including locking means for locking the legs in a closed position when the first and second leg extensions are positioned in the first retracted position.

36. The cutting device of claim 34, wherein one of the leg extensions includes a latch, and when said leg extension is moved into its first retracted position when the legs are in the closed position, the latch engages a portion of the other leg or leg extension and the first and second legs become locked in the closed position.

* * * * *